Jan. 16, 1934.   H. D. GEYER   1,943,915
STEERING WHEEL
Filed Sept. 15, 1932
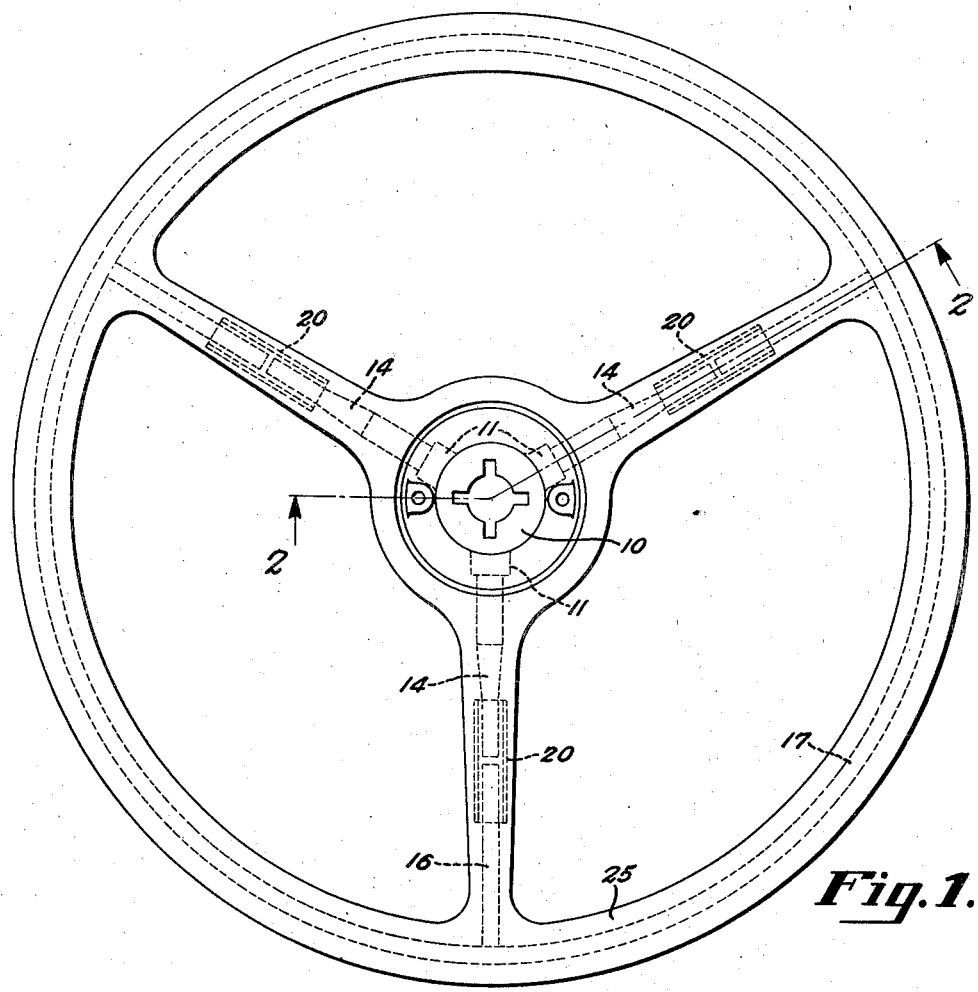
Fig.1.
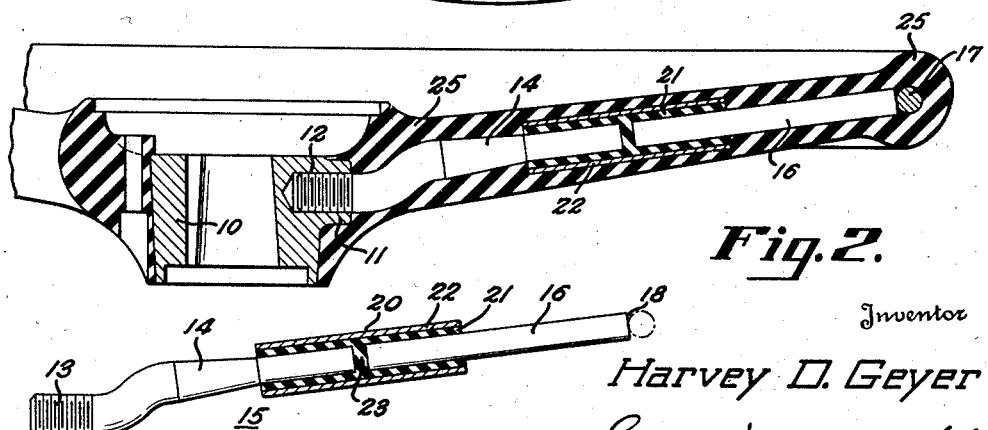
Fig.2.
Fig.3.
Inventor
Harvey D. Geyer
By Spencer Hardman & Fehr
his Attorneys Patented Jan. 16, 1934

1,943,915

UNITED STATES PATENT OFFICE 1,943,915

STEERING WHEEL

Harvey D. Geyer, Dayton, Ohio, assignor to The Inland Manufacturing Company, Dayton, Ohio, a corporation of Delaware Application September 15, 1932
Serial No. 633,298

8 Claims. (Cl. 74—33)

This invention relates to handwheels, especially such as are adapted for use as steering wheels on automotive vehicles.

An object of this invention is to provide a resilient steering wheel for automobiles which will eliminate the transmission of engine or other vibrations through the steering mechanism to the rim of the steering wheel which is grasped by the operator.

Another object is to provide a strong and efficient steering wheel having its rim of resilient rubber whereby to render it more comfortable for the operator's hands, and at the same time have the necessary strength.

Another object is to provide a metal reinforced steering wheel which, when subjected to large sudden forces or blows, is capable by its resiliency of distributing the force of such blows over a greater portion of the metal reinforcement and thereby minimize the danger of failure of the wheel at such times. Also the resiliency of such a wheel and its resistance to breaking up will minimize danger of severe injury to the driver's body if it is hurled violently against the steering wheel in a crash.

Further objects and advantages of the present invention will be apparent from the following description reference being had to the accompanying drawing wherein a preferred embodiment of one form of the present invention is clearly shown.

In the drawing:

Fig. 1 is a plan view of an automobile steering wheel made according to this invention.

Fig. 2 is a section on line 2—2 of Fig. 1 and shows the interior structure.

Fig. 3 is a detail view showing a metal spoke with the flexible joint therein, the individual spokes being made thus prior to their being assembled to the metal hub and rim.

In the drawing similar reference characters refer to similar parts throughout the several views.

Numeral 10 designates the metal hub, which in the form illustrated has three radial bosses 11, each having threaded recesses 12 for the reception of the inner threaded ends 13 of the inner spoke portions 14.

The spoke reinforcement unit shown in Fig. 3 is designated by reference numeral 15 and is made to this form prior to being attached to the hub 10 or metal rim reinforcement 17. Unit 15 comprises separate inner and outer spoke portions 14 and 16 which are connected together by an isolating flexible joint 20 which permits the desired degree of flexibility of the spokes but at the same time is capable of transmitting a high rotative torque or turning movement from the rim to the hub. This joint 20 is preferably made by snugly inserting the adjacent ends of spoke portions 14 and 16 into the soft rubber bushing 21 and then slipping the metal tube 22 snugly over the rubber bushing. The rubber is preferably then put under initial compression by slightly flattening, corrugating, or reducing the diameter of metal tube 22 by swaging or by any other suitable method. Preferably the soft rubber bushing 21 has a transverse partition 23 at its central point which fills the space between the ends of the spoke portions and so holds them properly spaced apart and also gives a uniform length to all the spoke units 15 prior to their attachment to the hub 10 and rim 17.

The reinforcing metal skeleton is assembled by screwing the inner threaded ends 13 of the spoke units 15 in the hub recesses 12 and thereafter rigidly welding the outer ends 18 of said spoke units to the metal rim ring 17, preferably by electric welding. The rim ring 17 is preferably heavy steel wire which possesses considerable resiliency.

The thus formed metal skeleton is then used as an insert and has the soft rubber body 25 molded thereupon in molding dies in a manner well known in the rubber molding art. In the wheel chosen for illustration, the soft rubber body 25 not only encases the rim ring 17 and spoke units 15 but also surrounds and encases the metal hub 10 and forms a substantial part of the final wheel hub. However, this invention is not limited to a hub which is so encased by the rubber body 25 since obviously the merits of this invention would still be present if the rubber covering 25 on the spokes extended only to a central metal hub of some other design. In operation the resiliency of the soft rubber body 25 permits the spokes to yield readily at their flexible joints 20 without breaking or cracking the rubber covering. Also the resiliency of the rim ring 17 increases the general flexibility of the outer portion of the finished wheel; for instance, any point of the wheel rim may be readily depressed or raised for a distance of about an inch without correspondingly deflecting a diametrically opposite point on the rim. The molded soft rubber body 25 preferably is provided with a finishing surface coating or varnish having a pyroxylin base which will present a good and durable finish which is not possible with soft rubber alone.

While the form of embodiment of the present invention as herein disclosed, constitutes a preferred form, it is to be understood that other forms might be adapted, all coming within the scope of the claims which follow.

What is claimed is as follows:

1. A handwheel adapted for use as a steering wheel on automotive vehicles, comprising: a metal skeleton having a hub, spokes and rim portion, said spokes each having an inner and outer portion flexibly connected together by means of a resilient rubber bushing encasing the adjacent ends of said inner and outer portions, and a non-metallic covering for said metal skeleton.

2. A handwheel adapted for use as a steering wheel on automotive vehicles, comprising: a metal skeleton having a hub, spokes and rim portion, said spokes each having an inner and outer portion flexibly connected together by means of a non-metallic bushing encasing the adjacent ends of said inner and outer portions and a metal tube encasing said bushing, and a non-metallic covering for said metal skeleton.

3. A handwheel adapted for use as a steering wheel on automotive vehicles, comprising: a metal skeleton having a hub, spokes and rim portion, said spokes each having an inner portion rigidly fixed to said hub and an outer portion rigidly fixed to said rim, said inner and outer portions being flexibly connected together by means of a resilient rubber bushing encasing the adjacent ends thereof, and a non-metallic covering for said metal skeleton.

4. A handwheel adapted for use as a steering wheel on automotive vehicles, comprising: a metal skeleton having a hub, spokes and rim portion, said spokes each having an inner and outer portion flexibly connected together by means of a resilient rubber bushing encasing the adjacent ends of said inner and outer portions, and a molded resilient rubber covering for said flexible spokes and metal rim portion.

5. A handwheel adapted for use as a steering wheel on automotive vehicles, comprising: a hub, metal spokes, and a rim portion, said spokes each having an inner and outer portion flexibly connected together by means of a resilient non-metallic bushing encasing the adjacent ends of said inner and outer portions.

6. A handwheel adapted for use as a steering wheel on automotive vehicles, comprising: a hub, metal spokes, and a rim portion, said spokes each having an inner and outer portion flexibly connected together by means of a resilient non-metallic bushing encasing the adjacent ends of said inner and outer portions, and a metal tube snugly encasing said resilient bushing and overlapping the adjacent ends of the metal spoke portions.

7. A handwheel adapted for use as a steering wheel on automotive vehicles, comprising: a hub, spokes each having a flexible joint therein, and a rim portion, said spokes each having an inner separate metal portion rigidly fixed to said hub and an outer separate metal portion rigidly fixed to said rim, said inner and outer portions being isolated from each other by a resilient non-metallic body, and a resilient molded covering encasing and concealing the spoke joints thus formed.

8. A handwheel adapted for use as a steering wheel on automotive vehicles, comprising: a hub, spokes each having a flexible joint therein, and a rim portion, said spokes each having an inner and outer metal portion isolated from each other by a resilient non-metallic block, and a resilient non-metallic molded covering for said spokes encasing and concealing the flexible joints thus formed.

HARVEY D. GEYER.